Dec. 1, 1970  A. S. MARLOW  3,543,368

VARIABLE CAPACITY FLUID DISCHARGE DEVICE

Filed March 26, 1968  5 Sheets-Sheet 1

INVENTOR
ALFRED S. MARLOW
BY
Brumbaugh, Free, Graves & Donohue
HIS ATTORNEYS

Dec. 1, 1970  A. S. MARLOW  3,543,368

VARIABLE CAPACITY FLUID DISCHARGE DEVICE

Filed March 26, 1968  5 Sheets-Sheet 2

INVENTOR
ALFRED S. MARLOW
BY
Brumbaugh, Free, Graves & Donohue
HIS ATTORNEYS

FIG.7.
FIG.8.
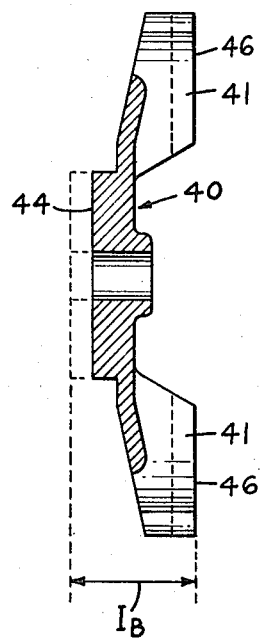
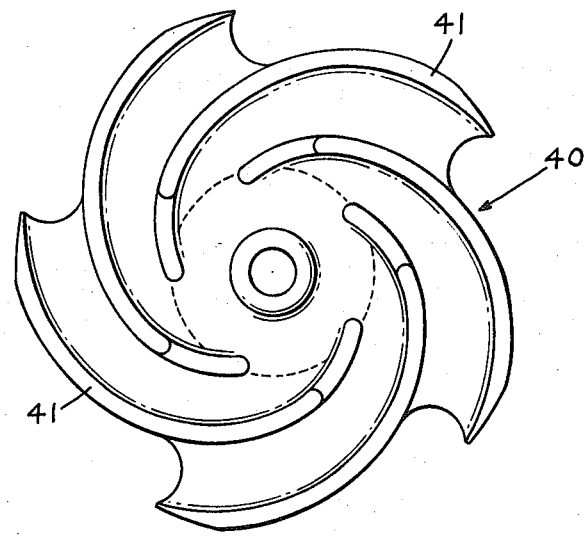
FIG.9. FIG.9A. FIG.9B. FIG.9C.
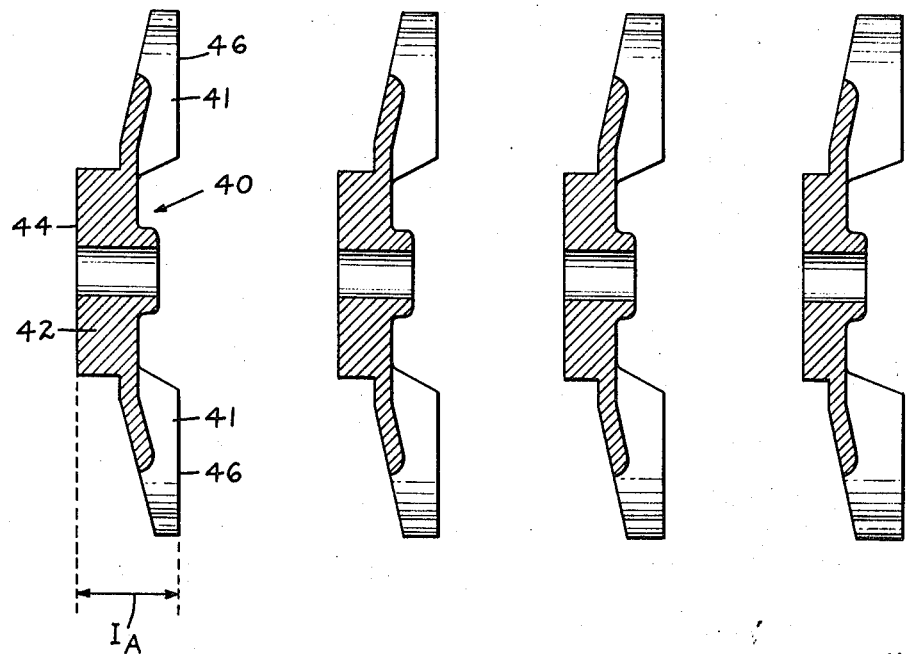
INVENTOR
ALFRED S. MARLOW
BY
HIS ATTORNEYS

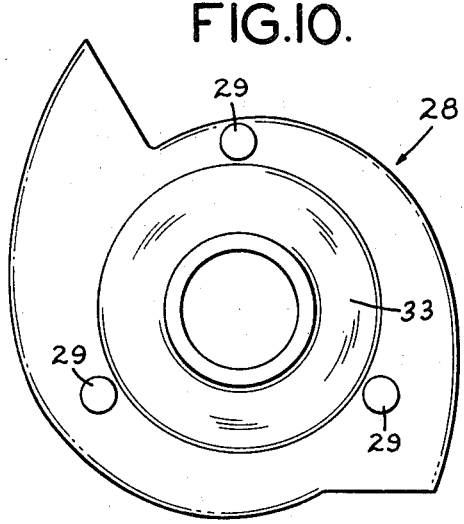
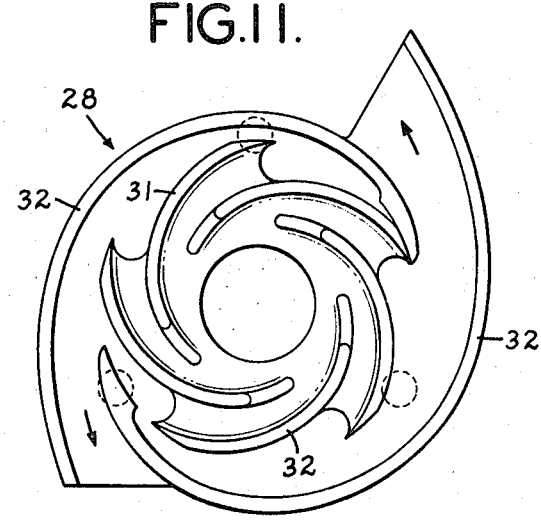
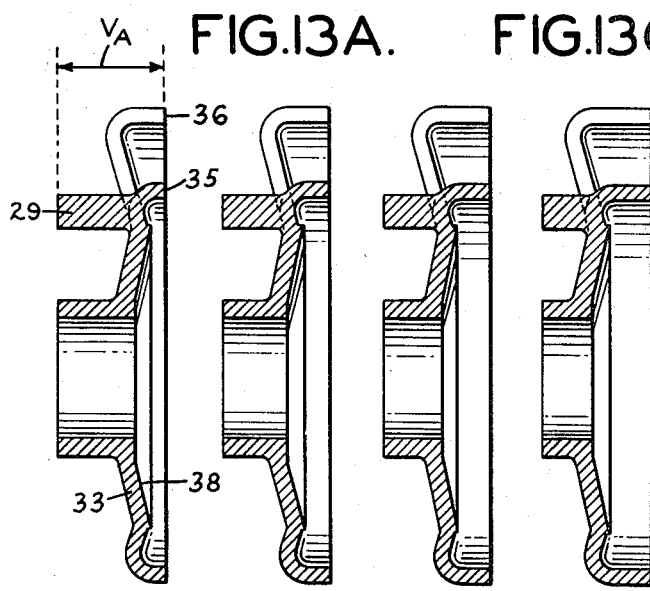
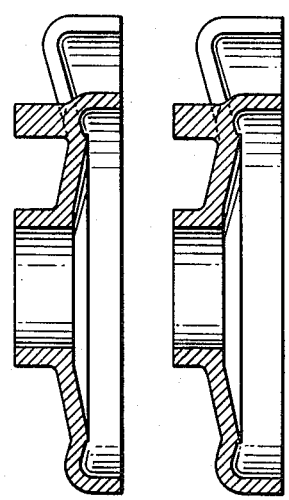
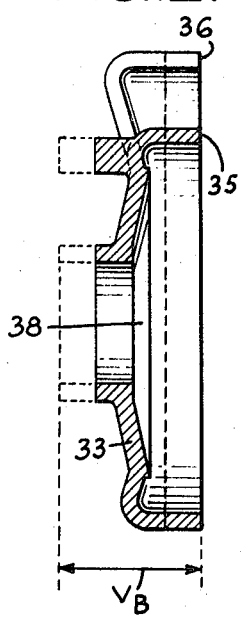

Dec. 1, 1970 A. S. MARLOW 3,543,368
VARIABLE CAPACITY FLUID DISCHARGE DEVICE
Filed March 26, 1968 5 Sheets-Sheet 5

INVENTOR
ALFRED S. MARLOW
BY
Bumbaugh, Free, Graves & Donohue
HIS ATTORNEYS

United States Patent Office 3,543,368
Patented Dec. 1, 1970

3,543,368
VARIABLE CAPACITY FLUID DISCHARGE DEVICE
Alfred S. Marlow, Weatherstone, Sharon, Conn. 06069
Filed Mar. 26, 1968, Ser. No. 716,145
Int. Cl. B21k 3/04
U.S. Cl. 29—156.8               3 Claims

ABSTRACT OF THE DISCLOSURE

A fluid discharge device such as a centrifugal pump having a housing with fixed interior dimensions and configuration but with replaceable volute and impeller of variable dimensions for selectively changing the fluid flow capacity and characteristics of the device.

---

The present invention relates to a fluid discharge device with replaceable elements and a method of manufacturing the device to provide different selected performance characteristics, and, more particularly, a novel and improved structural arrangement of a replaceable volute and impeller and in a fluid discharge device such as a centrifugal pump.

Various forms of conventional fluid discharge devices such as centrifugal pumps and air compressors have incorporated relatively rotating impellers and volutes or diffusers having complementary surfaces and configurations in a housing chamber intermediate an intake or suction passage and a discharge passage. Such fluid discharge devices are conventionally driven by motors or engines having selected power outputs, and the discharge devices, themselves, are conventionally manufactured with a variety of housing, volute and impeller constructions to match the different required pumping characteristics and horsepower requirements.

In accordance with the invention, there is provided a novel and improved structural arrangement and method of manufacture of fluid discharge devices wherein a single housing and a set of standard replaceable volute and impeller blanks can be assembled to provide a complete line of compact and highly serviceable discharge units matching different pumping characteristics and horsepower requirements. For example, with a given set of impeller and volute blanks, a fluid discharge device such as a centrifugal pump can match motor or engine power output in a range from ½ to 7 horsepower merely by grinding the front and/or the back of the impeller and volute blanks to produce different complementary blade depths for a selected impeller and a volute to provide different selected pumping characteristics.

For a more complete understanding of the invention, reference may be had to the following detailed disclosure taken in conjunction with the accompanying figures of the exemplary drawings:

FIG. 7 is a cross-sectional view of an exemplary embodiment of the impeller with a dotted outline indicating the maximum size of the impeller blank, in accordance with the invention;

FIG. 8 is an plan view of the impeller of FIG. 7;

FIGS. 9, 9A, 9B and 9C are a plurality of cross-sectional views of impellers of uniform total axial dimension, but of different vane depths made from the same impeller blank, in accordance with the invention;

FIGS. 10 and 11 are top and bottom plan views of an exemplary embodiment of a removable volute, in accordance with the invention;

FIG. 12 is a cross-sectional view of the volute of FIGS. 10 and 11 with a dotted outline showing the maximum size of the volute blank;

FIGS. 13, 13A, 13B and 13C are cross-sectional views of volutes of uniform total axial dimension, but with different flange depths made from the same volute blank, in accordance with the invention.

Figure 1:
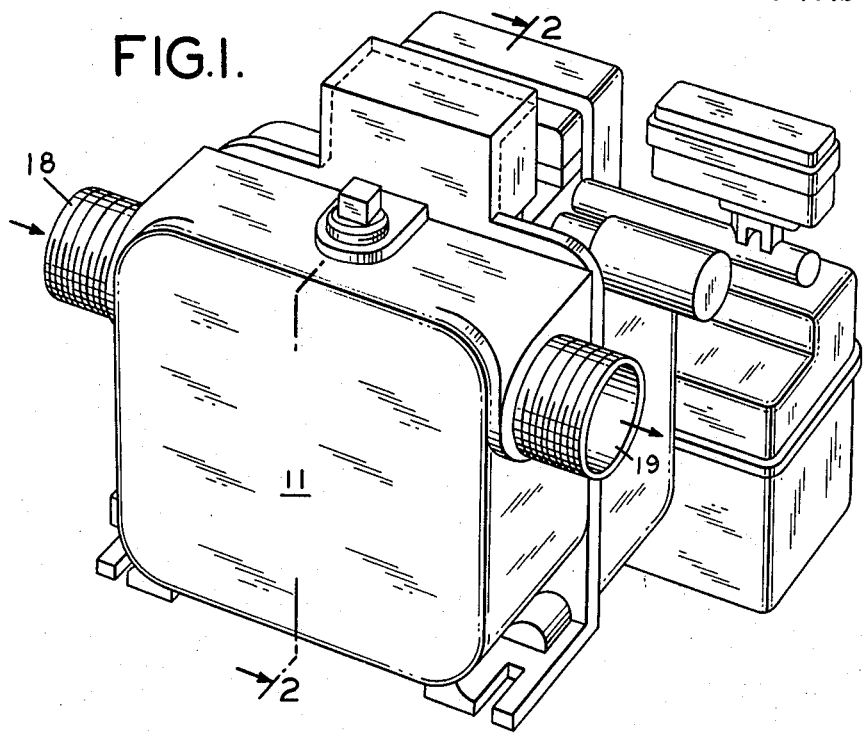
FIG. 1 is a pictorial representation of an exemplary embodiment of a fluid discharge device in accordance with the invention.
Figure 2:
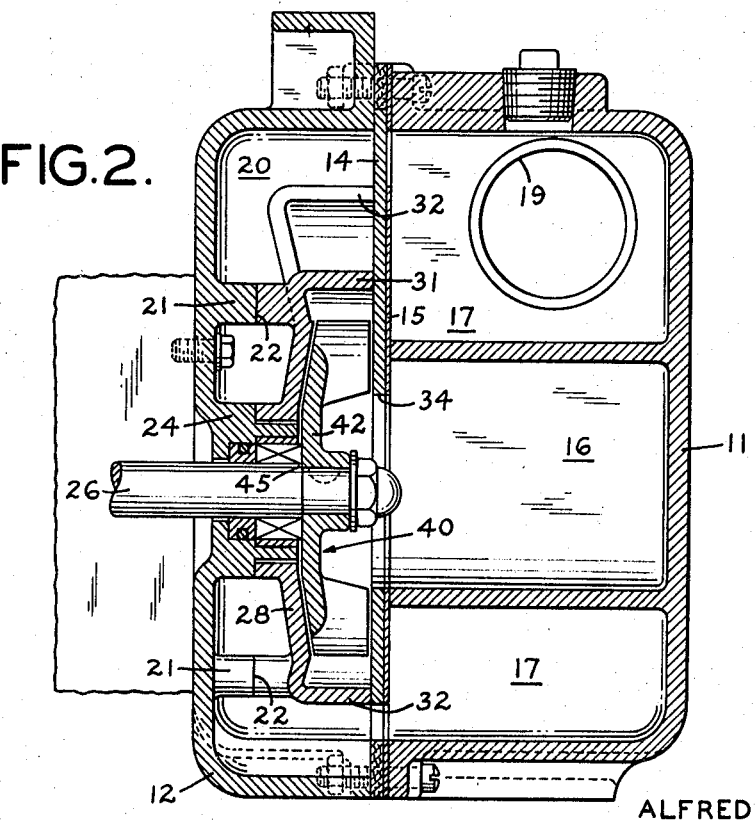
FIG. 2 is a cross-sectional view of the fluid discharge device of FIG. 1 taken through the plane 2—2 and looking in the direction of the arrows.
Figure 3:
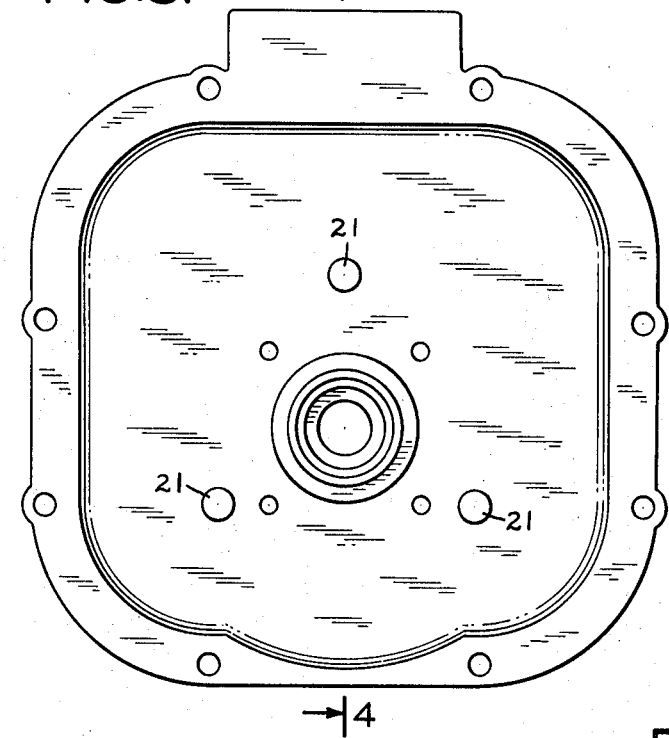
FIGS. 3 and 4 are plan and cross-sectional views, respectively, of the interior of the discharge device housing forming the volute and impeller chamber.

As shown for example in FIG. 2, the fluid discharge device is a centrifugal pump having a housing body cover 11 bolted to a housing body 12 in a suitable conventional manner. Interposed between the housing body cover 11 and the housing body 12 is a partition or wall 14 constituting a planar apertured wear plate. A conventional gasket 15 of suitable configuration is used to separate and seal an intake or suction passage 16 formed in the housing body cover 11 from a discharge passage 17, also formed in the housing body cover 11.

The intake passage 16 may be suitably coupled in any conventional manner through a port 18 to a fluid source (not shown). The discharge passage 17 may be suitably coupled through a port 19 to any suitable utilization device (not shown). A conventional check valve (not shown) may be suitably mounted in the discharge passage 17 in appropriate relation to the discharge port 19.

Figure 4:
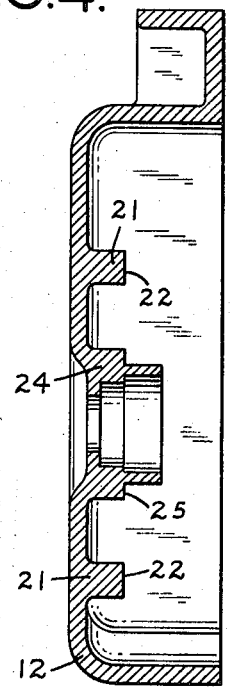
Figures 5, 6:
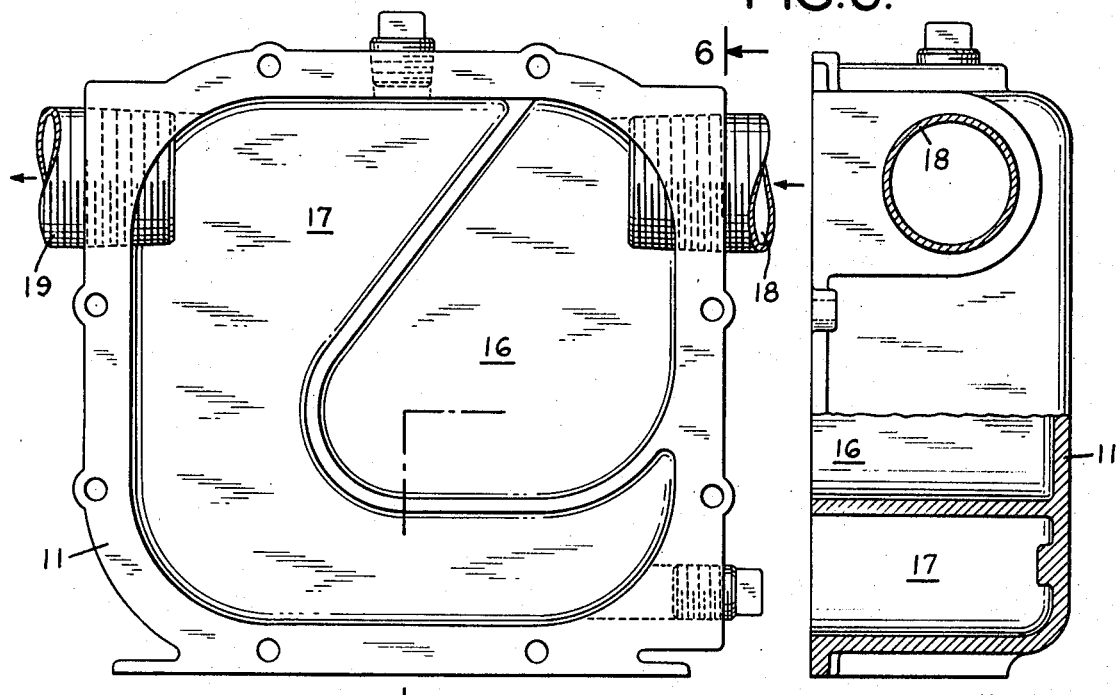
FIGS. 5 and 6 are plan and partially broken-away end views of the discharge device housing forming the intake and discharge passage.

The housing body 12 with the wear plate 14 forms a chamber intermediate the intake and discharge passages 16 and 17. A plurality of surface engaging means 21 in the form of surface engaging bosses or studs having positioning surfaces 22 (see FIG. 4) are circumferentially spaced about a centrally disposed cylindrical boss 24 having an exterior shoulder 25.

A drive shaft 26 is rotatably mounted by conventional bearing and seal means within the cylindrical boss 24. The drive shaft 26 may be conventionally driven either directly, indirectly, or through a flexible coupling by a suitable motor or engine of a power output or horsepower appropriate to the particular application.

A removable volute 28 is mounted on the exterior shoulder 25 of the cylindrical boss 24 and has a plurality of positioning surfaces 29 adapted to engage the surface engaging bosses 21, and a plurality of convolute channel defining flanges 31 and 32 radially depending from a hub 33 and extending to and in engagement with the wear plate 14 at respective circumferentially spaced positions about an aperture 34 formed in the wear plate 14. The edges 35 and 36, respectively, of the channel defining flanges 31 and 32 lie in a common plane contiguous the planar surface of the wear plate 14.

An interior surface 38 of the volute hub 33 in conjunction with the flanges 31 forms a fixed predetermined surface of revolution about the axis of the shaft 26 in alignment with the aperture 34 of the wear plate 14 and defining an interior cavity.

An impeller 40 of suitable configuration, for example, having a plurality of convolute vanes 41 is fixedly mounted on the end of the drive shaft 26 within the cavity formed by the volute hub 33 and the volute flanges 31. The impeller 40, as shown, may be conventionally keyed and bolted to the end of the shaft 26 or fixedly coupled in any other suitable manner.

The impeller 40 has a hub 42 which is positioned adjacent the axial extremity of the cylindrical boss 24. The portion 44 of the impeller hub 42 provides a positioning surface adapted to engage a fixed positioning or locating point or surface 45, forming a shoulder on the drive shaft 26, the positioning or locating point 45 normally being fixed relative to the housing body cover 12.

The plurality of impeller vanes 41 are axially directed toward the wear plate 14 and positioned circumferentially about the aperture 34. The edges 46 of the vanes 41 are adapted to overlie the planar surface of the wear plate 14 in a plane parallel to and substantially contiguous the planar wear plate 14.

The portion of the impeller hub 42 adjacent the volute hub interior surface 38 and radially outward portions of the vanes 41 define a surface of revolution substantially complementary with that of the volute interior cavity. The volumetric fluid capacity of the volute and impeller is a function of the depth of the volute flanges and impeler vanes from their axial extremities or ends adjacent the wear plate 14 to their respective hubs.

Depending upon the desired performance characteristics and horsepower requirements of the particular pump application and the characteristics of the power source, the fluid volumetric capacity of the volute and impeller are selected, in accordance with well known fluid dynamic principles.

In accordance with the invention, the volute 28 and the impeller 41 are suitably prepared from standard blanks having a total axial dimension substantially greater than the space within which they are intended to be assembled.

For example, as shown in FIG. 7, the total axial dimension $I_B$ of the impeller 40 is substantially greater than the axial dimension between the fixed positioning point 45 and the plane of the apertured wear plate 14, whereas the axial dimension $I_A$ of the finished impellers 40 shown in FIGS. 9 through 9C, for example, is substantially equal to but slightly less than that dimension, so that the impeller 40 can freely rotate within the interior volute cavity.

Similarly, the total axial dimension $V_B$ of the volute blank (FIG. 12) is substantially greater than the axial dimension of the spacing between the positioning surface 22 of the housing 12 and the wear plate 14, whereas the axial dimension $V_A$ of the finished volutes of FIGS. 13 through 13C is substantially equal to the permissible axial dimension between the positioning means 22 and the wear plate 14.

Upon selection of the required flange and vane depths, material is appropriately removed from either one or both faces of the volute and impeller blanks, for example, by flat surface grinding or the like.

Figure 14:
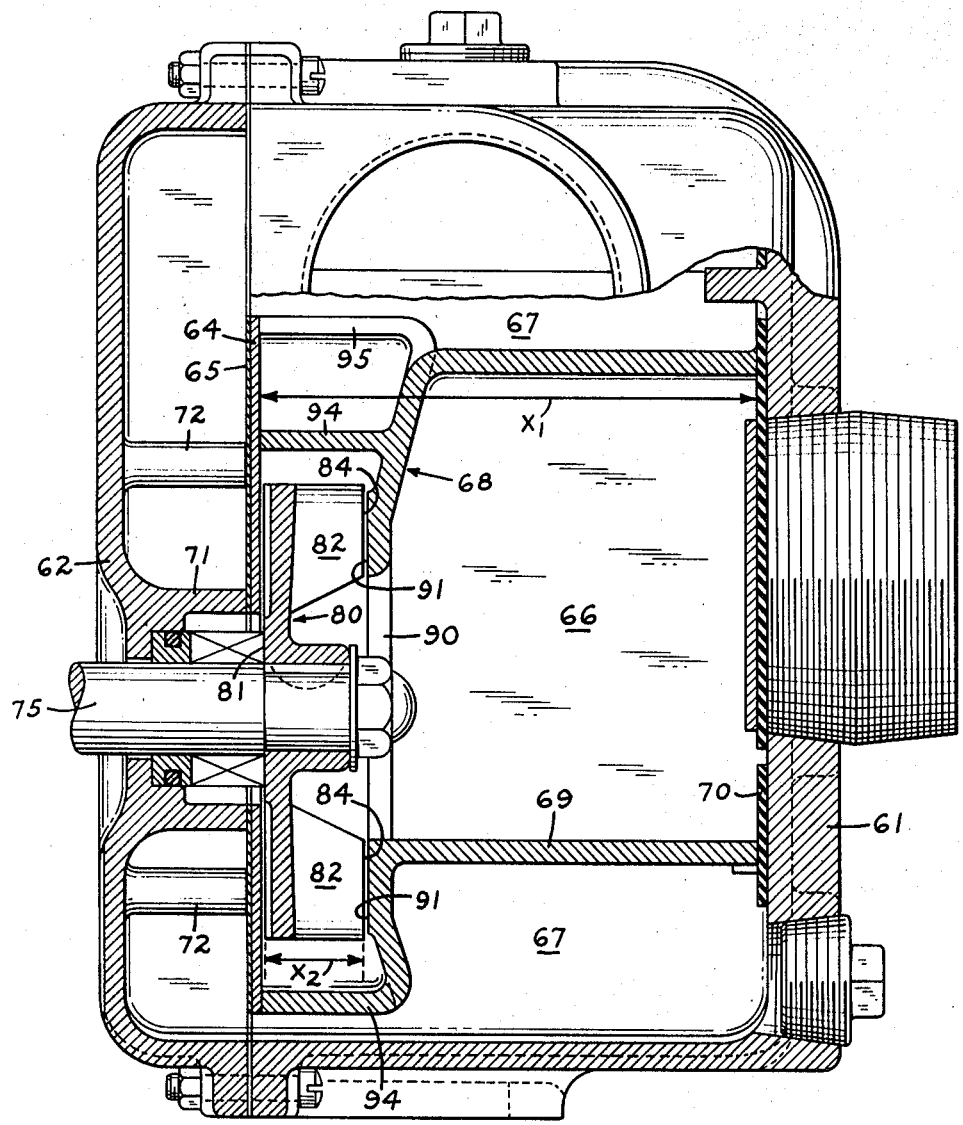
FIG. 14 is a cross-sectional view of an alternate embodiment of the invention.

In the alternate embodiment of FIG. 14, the centrifugal pump comprises a housing cover 61 which may be suitably bolted to a housing body 62, the interior spaces being separated by a planar apertured wear plate 64 and a suitable gasket 65. The interior of the housing cover 61 is separated into an intake passage 66 and a discharge passage 67 by means of a centrally apertured unitary volute 68.

In this embodiment, the volute includes an inlet tube or chimney 69, the outer extremities of which constitute a positioning surface engaging the housing cover 61, suitable gasket means 70 being interposed therebetween.

The housing body 62 includes a centrally located cylindrical boss 71 and a plurality of surface engaging bosses 72 adapted to engage and support the planar wear plate 64 and the gasket 65. A drive shaft 75 is rotatably mounted in any suitable conventional manner within the cylindrical boss 71.

An impeller 80 is fixedly mounted on the end of the drive shaft 75 in the volute cavity for rotation about the axis of the drive shaft, which is aligned with the apertures in the planar wear plate 64 and the volute 68. The impeller 80 has a positioning surface 81 adapted to bear against conventional bearings used for rotatably mounting the drive shaft 75 in the cylindrical boss 71. The impeller 80 has a plurality of circumferentially spaced-apart radially disposed vanes 82 with planar, axially directed, radial edges 84 positioned circumferentially about the central aperture 90 of the volute 68 in a plane parallel to and substantially contiguous the planar interior volute hub surface 91 and in overlying relation therewith.

The volute 68 includes a plurality of channel defining flanges 94 and 95 extending toward and in engagement with the wear plate 64 in an axial direction opposite to the inlet tube 69.

As was the case with the embodiment of FIG. 2, the removable volute 68 and the impeller 80 are cast or otherwise formed as standard blanks having axial dimensions greater than the dimensions required for the intended use. For example, in FIG. 14 the distance $X_1$ is a fixed distance or spacing between the planar wear plate 64 and the housing cover 61, and an assembled volute after having its axial extremities ground to the selected size for a particular horsepower or volumetric capacity will have an axial dimension equal to $X_1$.

The axial distance between the wear plate 64 and the volute hub interior surface 91 is selected to be slightly greater than the variable dimension $X_2$ (the selected axial dimension of the impeller plates 82) so that the impeller 80 can freely rotate within the volute cavity. However, as in the case of the pump of FIG. 2, the portion of the impeller hub and vanes adjacent the volute hub interior surface 91 and the wear plate 64 define a surface of revolution substantially complementary with that of the volute cavity.

Thus there is provided in accordance with the invention novel and improved structural combinations of the volute and impeller in a fluid discharge device, wherein the structural configuration of the volute and impeller elements are such as to permit the selective assembly and manufacture of fluid discharge devices of different volumetric capacity to match desired performance characteristics and horsepower requirements.

It will be obvious to those skilled in the art that the above described embodiments are meant to be merely exemplary, and that they are susceptible of modification and variation without departing from the spirit and scope of the invention. Therefore, the invention is not deemed to be limited, except as defined in the appended claims.

I claim:

1. A method of manufacturing a fluid discharge device having a housing with intake and discharge passages, a planar apertured wear plate, and a removable centrally apertured unitary volute and an impeller having complementary surfaces adapted for relative rotation and positioned intermediate the housing and the planar wear plate, the removable volute having at least one positioning surface adapted to engage the housing and a plurality of channel defining flanges of selected axial depth radially depending from a hub and extending axially in a direction opposite to the volute positioning surface about the axis of rotation of the impeller within the volute, the volute flanges having axially directed edges lying in a common plane and adapted to engage the apertured wear plate, the impeller having a hub and a plurality of circumferentially spaced-apart radially disposed vanes of selected axial depth extending axially from the impeller hub with respective axially directed edges adapted to overlie at least in part an apertured planar wall surface having an aperture communicating with the intake passage and disposed in a common plane, the impeller hub extending axially in a direction opposite to the vane edges to define a positioning surface, comprising the steps of fabricating standard complementary volute and impeller blanks of uniform configuration and dimension wherein the axial dimension of the volute between the volute positioning surface and the common plane of the volute flange edges is substantially greater than the predetermined fixed distance between that portion of the housing adapted to be engaged thereby and the wear plate and the axial dimension of the impeller between the positioning surface of the impeller hub and the common plane of the axially directed vane edges is at least as great as the maximum axial dimension between a fixed positioning point adapted to locate the impeller hub positioning surface upon assembly and the apertured planar wall surface, and selectively removing material from the volute and impeller blanks to reduce the axial dimensions thereof to conform to the permissible axial dimensions for assembly within the housing chamber but with the volute flange and impeller vane depths selected from a range of depths capable of providing a variety of different operational performances and fluid flow characteristics by varying the volumetric fluid capacity of the volute and impeller.

2. A method of manufacturing a fluid discharge device having a housing with intake and discharge passages and a chamber intermediate said intake and discharge passages having one wall constituting at least in part a planar apertured wear plate communicating the chamber with the intake passage and surface engaging means disposed in the chamber opposite the wear plate at a predetermined fixed distance therefrom, and a removable volute and an impeller having complementary surfaces adapted for relative rotation and positioned in the chamber intermediate the surfacing engaging means and the planar wear plate, the removable volute having a positioning surface adapted to engage the housing surface engaging means and a plurality of channel defining flanges of selected axial depth radially depending from a hub and extending axially in a direction opposite to the volute positioning surface about the axis of rotation of the impeller within the volute, the volute flanges having axially directed edges lying a common plane and adapted to engage the apertured wear plate, the impeller having a hub and a plurality of circumferentially spaced-apart radially disposed vanes of selected axial depth extending axially from the impeller hub with respective axially directed edges adapted to overlie at least in part the wear plate and disposed in a common plane, the impeller hub extending axially in a direction opposite to the vane edges to define a positioning surface, comprising the steps of fabricating standard complementary volute and impeller blanks of uniform configuration and dimension wherein the axial dimension of the volute between the volute positioning surface and the common plane of the volute flange edges is substantially greater than the predetermined fixed distance between the housing surface engaging means and the wear plate and the axial dimension of the impeller between the positioning surface of the impeller hub and the common plane of the axially directed vane edges is substantially greater than the axial dimension between a fixed positioning point adapted to locate the impeller hub positioning surface upon assembly and the plane of the apertured wear plate, and selectively removing material from the volute and impeller blanks to reduce the axial dimensions thereof to conform to the permissible axial dimensions for assembly within the housing chamber but with the volute flange and impeller vane depths selected from a range of depths capable of providing a variety of different operational performances and fluid flow characteristics by varying the volumetric fluid capacity of the volute and impeller.

3. A method of manufacturing a fluid discharge device having a housing with intake and discharge passages, a planar apertured wear plate positioned interiorly of said housing, and a removable centrally apertured unitary volute and an impeller having complementary surfaces adapted for relative rotation and positioned intermediate the housing and the planar wear plate, the removable volute having an axially extending positioning surface engaging means adapted to engage the housing and a plurality of channel defining flanges of selected axial depth radially depending from a hub and extending axially in a direction opposite to the volute positioning surface engaging means about the axis of rotation of the impeller within the volute, the volute flanges having axially directed edges lying in a common plane and adapted to engage the apertured wear plate, the volute hub having a planar interior hub surface circumferentially disposed about the volute aperture, the impeller having a hub and a plurality of circumferentially spaced-apart radially disposed vanes of selected axial depth extending axially from the impeller hub with respective axially directed edges adapted to overlie at least in part the planar interior hub surface and disposed substantially in a common plane therewith, the impeller hub extending axially in a direction opposite to the vane edges to define a positioning surface, comprising the steps of fabricating standard complementary volute and impeller blanks of uniform configuration and dimension wherein the axial dimension of the volute between the volute positioning surface and the common plane of the volute flange edges is substantially greater than the predetermined fixed distance between that portion of the housing adapted to be engaged thereby and the wear plate and the axial dimension of the impeller between the positioning surface of the impeller hub and the common plane of the axially directed vane edges is at least as great as the maximum axial dimension between a fixed positioning point adapted to locate the impeller hub positioning surface upon assembly and the plane of the planar interior hub surface, and selectively removing material from the volute and impeller blanks to reduce the axial dimensions thereof to conform to the permissible axial dimensions for assembly within the housing chamber but with the volute flange and impeller vane depths selected from a range of depths capable of providing a variety of different operational performances and fluid flow characteristics by varying the volumetric fluid capacity of the volute and impeller.

References Cited

UNITED STATES PATENTS

| 2,642,044 | 6/1953 | Bergh | 103—103 |
| 2,306,742 | 12/1942 | Moody. | |
| 2,585,406 | 2/1952 | Reynolds | 29—156.8 X |

FOREIGN PATENTS

| 699,742 | 6/1959 | Canada. |
| 336,840 | 10/1930 | Great Britain. |

JOHN F. CAMPBELL, Primary Examiner

D. C. REILEY, Assistant Examiner

U.S. Cl. X.R.

103—103, 113